Patented Aug. 15, 1939

2,169,458

UNITED STATES PATENT OFFICE 2,169,458

METHOD OF SEALING OFF WATER AND GAS LAYERS

Franklin A. Bent, Albert G. Loomis, and Howard C. Lawton, Berkeley, Calif., assignors to Shell Development Company, San Francisco, Calif., a corporation of Delaware No Drawing. Application November 15, 1937, Serial No. 174,654

7 Claims. (Cl. 166—21)

This invention pertains to the treatment of gas and oil wells, and relates more specifically to a chemical method for plugging or sealing off water and gas-bearing formations.

Water and gas often occur in layers parallel and closely adjacent the oil sands traversed by a well. In cases when it is difficult or impossible to cement off these undesirable layers without at the same time interfering with the flow of oil, chemical methods are commonly used to prevent water or excessive amounts of gas from entering the well. For this purpose, a treating agent is introduced into the well, forced into the layer to be sealed off, and caused to deposit a precipitate in the pores of said layer, thereby substantially decreasing its permeability to the flow of water or gases.

The processes which have so far been used for the chemical shut-off of oil wells are, however, not entirely satisfactory. Some of these processes require the use of a combination of several treating agents to form the plugging precipitate by chemical reaction between said agents, which makes these processes cumbersome and expensive. Other methods are uncertain in their action since they rely for the same purpose on the presence in the formation waters of some particular salts. Still other methods use agents which are unstable, volatile, poisonous in their effects, and tend to form acid substances corrosive to the equipment.

It is, therefore, the object of the present invention to provide a method for selectively sealing off porous formations, such as water and gas layers without interfering with the flow of oil, by introducing into the wells and forcing into the formation certain metallic derivatives of the alcohols capable of forming by hydrolysis water-insoluble metallic hydroxides which are deposited in the pores of the strata to be treated and serve to plug or seal the pores to the flow of water or gas.

The method of the present invention does not require the use of several reagents, but may be carried out, if desired, by means of a single treating solution, the hydrolysis reaction occurring upon contact with connate waters of any chemical composition, or with an aqueous charge injected into the formation. The deposited metallic hydroxides, being soluble in acid, can furthermore be easily removed from the formation by acid treatment, for example, in case the deposit had been incorrectly placed in an oil bearing layer.

The metallic derivatives of the alcohols used according to the present invention are those known as metal alcoholates. They are stable, substantially neutral and non-volatile compounds which can be represented by the formula:

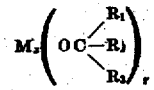

wherein: M represents any metal which forms water-insoluble or substantially water-insoluble, (for example, to the extent of 1 part in 10,000 parts of water), but preferably acid soluble hydroxides, such as aluminum, copper, iron, tin, magnesium, zinc, lead, chromium, manganese, nickel, and cobalt. Some metals, for example, calcium, or barium, whose hydroxides have a somewhat greater solubility in pure water than that indicated above, may equally well be used, since the presence of various salts in the formation waters considerably decreases the solubility of said hydroxides, and makes them suitable for the purposes of the present invention. C and O represent a carbon and an oxygen atom, respectively. $R_1$, $R_2$, and $R_3$ represent hydrogen atoms, or alkyl or aryl radicals, which may be substituted or not. The substituting groups may be selected from the group consisting of halogens, O, OH, $NH_2$, $NO_2$, SCN, and $SO_2$. $x$ and $y$ are subscripts satisfying valence requirements.

In preparing the above metal alcoholates the following alcohols may be used as starting material:

(1) Aliphatic primary, secondary, and tertiary saturated and unsaturated monohydric alcohols, such as methyl, ethyl, isopropyl, tertiary butyl, secondary amyl, normal decyl alcohol, propargyl alcohol, etc.
(2) Aliphatic polyhydric alcohols such as ethylene glycol, trimethylene glycol, propylene glycol, amylene glycols, hexylene glycols, glycerin, etc.
(3) Aryl alcohols, such as phenol, cresol, xylenol, benzyl alcohol, phenyl-ethyl alcohol, phenyl-methyl carbinol, etc.
(4) Substituted alcohols of the above types, such as monoethanolamine, hydroxyamylamine, glycol chlorhydrin, phenolic alcohols, etc.
(5) Mixtures of any alcohols of the above types.

Metallic alcoholates may be prepared from the above alcohols in a manner well known to the art. For example, aluminum alcoholates of alcohols, such as ethyl alcohol, etc., may be formed by direct reaction between activated aluminum and the alcohol. Alcoholates of higher boiling alcohols, such as ethylene glycol, glycerol, monoethanolamine, etc., may be formed by metathetic reaction with the aluminum alcoholates of the lower alcohols.

In treating a well with any of the above alcoholates which are usually solid at ordinary temperatures, it is desirable to employ a solvent or a dispersing agent, which facilitates the handling of the treating agents and secures a gradual action subject to control. The solvent or dispersing agents which are useful for this purpose may include any non-aqueous material such as mineral oils, gasoline, naphtha, benzene, alcohols, esters, ketones carbon tetrachloride, carbon disulphide, etc. The concentration of the metal alcoholate in such liquids may be varied over wide limits, especially good results being obtained within the range from 10 to 50 per cent or more by weight.

In applying the treatment of the present invention to an oil well in order to seal off water-bearing formations, the following procedure may be followed:

The well is first preferably filled with oil, and a desired amount of a non-aqueous solution consisting of or comprising a metal alcoholate is then introduced into the well through the tubing or casing, and is forced into the formation by pumping down another charge of oil, or by applying pressure to the well in any other known manner. The solution will diffuse into the formation water, forming by hydrolysis the desired water-insoluble metallic hydroxide, and an alcohol. When the flow of the well is reversed by pumping or swabbing, the water horizon will remain effectively plugged by said precipitate, while any part of the solution which may inadvertently have entered the oil horizon will be flushed out unchanged.

In sealing off gas-bearing layers, the same procedure may be followed, if the gas-bearing formation is sufficiently wet, as is often the case. If this formation, however, is dry or substantially dry, an aqueous liquid, such as water or brine, may be introduced into the well and forced into the formation before or after the injection of the treating metal alcoholate solution. The hydrolysis of the metal alcoholates in the pores of the formation then takes place as described above. In order to insure the formation of the insoluble metallic hydroxide as far back within the formation as possible, it may sometimes be desirable to introduce into the well and force into the formation a charge of a neutral material, such as oil, between the charges of the treating solution and of the aqueous liquid. It is understood that aqueous charges may be injected into the formation also while treating water-bearing strata, for example, to control the rate of the hydrolysis reaction.

Instead of pumping down the alcoholates or their solutions and/or the aqueous charge, these materials may be introduced into the well in suitable containers, and dumped at the desired levels.

In treating water and gas layers closely adjacent oil horizons, it may happen that a portion of the treating metal alcoholate solution is inadvertently forced into an oil sand, and is hydrolyzed within said sand by the interaction with the following aqueous charge, or with formation waters sometimes present in oil layers. Since, however, the metallic hydroxide, precipitated thereby, is soluble in acid, oil sands plugged in this manner can be easily restored to production by a subsequent acid treatment applied at the desired level.

In treating oil wells by the method of the present invention, it is desirable to control accurately the rate of hydrolysis of the metal alcoholates used, since a delayed hydrolysis will result in the precipitation of insoluble metallic hydroxides well back in the formation and secure the optimum sealing effect. The rate of hydrolysis may be effectively controlled in the present process in several ways:

(1) By varying the concentration of the metal alcoholate in the solution which is forced into the formation, higher concentrations giving a higher rate of hydrolysis.
(2) By properly selecting the particular metal alcoholate used in each case. Alcoholates formed of higher alcohols, or of substituted or polyhydric alcohols have generally a slower rate of hydrolysis than those formed of lower monohydric alcohols. The rate of hydrolysis of any given alcoholate can also be controlled by using it in admixture with other alcoholates. Thus, for example, the hydrolysis rate of aluminum secondary amyl alcoholate may be considerably reduced by admixing thereto proper amounts of the aluminum alcoholate of ethylene glycol, which has a slow hydrolysis rate.

Although the process of this invention has been described with regard to its uses in well-drilling practice, it is obvious that it can equally well be applied for sealing off and decreasing the permeability of any desired ground formations. Thus, the present invention may have a practical application in building canals, sluices or dykes in porous soil, where it is desirable to stop the percolation of water through the sand, or in constructing landing piers, tunnels, etc., in ground formations which are not sufficiently impervious to fluid flow.

We claim as our invention:

1. In a process for decreasing the permeability of a porous formation, the steps of introducing thereinto an alcoholate of a metal forming a water-insoluble hydroxide, and forming within said formation a water-insoluble hydroxide by reaction of said alcoholate with water.

2. In a process for decreasing the permeability of a porous formation, the steps of introducing thereinto a metal alcoholate having the formula

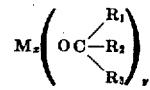

wherein M is any metal forming a water-insoluble hydroxide; O and C are an oxygen and a carbon atom, respectively; $R_1$, $R_2$, and $R_3$ are radicals selected from the group consisting of hydrogen, alkyl, aryl, substituted alkyl, and substituted aryl radicals, and $x$ and $y$ are subscripts satisfying valence requirements, and forming within said formation a water-insoluble hydroxide by reaction of said alcoholate with water.

3. In a process for sealing off water and gas-bearing formations traversed by a well, the steps of introducing into the well a treating non-aqueous liquid comprising an alcoholate of a metal forming water-insoluble hydroxides, applying pressure to force said liquid into the formations, and introducing into the well and forcing into the formations an aqueous liquid, to intermingle said non-aqueous liquid and said aqueous liquid within the formations, whereby a water-insoluble metallic hydroxide is precipitated within said formations.

4. In a process for sealing off water and gas-bearing formations traversed by a well, the steps of introducing into the well and forcing in said formations alternate charges of a treating non-aqueous liquid comprising an alcoholate of a metal forming water-insoluble hydroxides, of oil, and of an aqueous liquid, to effect a delayed mingling of said treating liquid with said aqueous liquid to take place within the formation, and whereby a water-insoluble hydroxide is formed therein by reaction between said two liquids.

5. In a process for decreasing the permeability of a porous formation, the steps of introducing thereinto a mixture of alcoholates of metals forming water-insoluble hydroxides, said mixture comprising at least one relatively slowly-hydrolyzable alcoholate of a higher alcohol, and slowly forming within said formation a water-insoluble hydroxide by reaction of said mixture with water.

6. In a process for decreasing the permeability of a porous formation, the steps of introducing thereinto a mixture of alcoholates of metals forming water-insoluble hydroxides, said mixture comprising at least one relatively slowly-hydrolyzable alcoholate of a substituted alcohol, and slowly forming within said formation a water-insoluble hydroxide by reaction of said mixture with water.

7. In a process for decreasing the permeability of a porous formation, the steps of introducing thereinto a mixture of alcoholates of metals forming water-insoluble hydroxides, said mixture comprising at least one relatively slowly-hydrolyzable alcoholate of a polyhydric alcohol, and slowly forming within said formation a water-insoluble hydroxide by reaction of said mixture with water.

FRANKLIN A. BENT.
ALBERT G. LOOMIS.
HOWARD C. LAWTON.

DISCLAIMER 2,169,458.—*Franklin A. Bent, Albert G. Loomis*, and *Howard C. Lawton*, Berkeley, Calif. METHOD OF SEALING OFF WATER AND GAS LAYERS. Patent dated August 15, 1939. Disclaimer filed October 1, 1940, by the assignee, *Shell Development Company*.

Hereby enters this disclaimer to claim 1 of said Letters Patent, and disclaims from the scope of claim 2 all processes for decreasing the permeability of a porous formation except those wherein there is introduced into the porous formation a metal alcoholate having the formula recited in claim 2, but wherein not more than one of the three radicals $R_1$, $R_2$, and $R_3$, is hydrogen, and disclaims from the scope of claim 3 all processes for sealing off water and gas bearing formations traversed by a well except those wherein there is introduced into the well a metal alcoholate having the formula

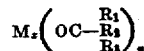

wherein M is any metal forming a water-insoluble hydroxide; O and C are an oxygen and a carbon atom, respectively; $R_1$, $R_2$, and $R_3$ are radicals selected from the group consisting of hydrogen, alkyl, aryl, substituted alkyl, and substituted aryl radicals, not more than one of which radicals is hydrogen, and $x$ and $y$ are subscripts satisfying valence requirements.

[*Official Gazette October 29, 1940.*]

aqueous liquid within the formations, whereby a water-insoluble metallic hydroxide is precipitated within said formations.

4. In a process for sealing off water and gas-bearing formations traversed by a well, the steps of introducing into the well and forcing in said formations alternate charges of a treating non-aqueous liquid comprising an alcoholate of a metal forming water-insoluble hydroxides, of oil, and of an aqueous liquid, to effect a delayed mingling of said treating liquid with said aqueous liquid to take place within the formation, and whereby a water-insoluble hydroxide is formed therein by reaction between said two liquids.

5. In a process for decreasing the permeability of a porous formation, the steps of introducing thereinto a mixture of alcoholates of metals forming water-insoluble hydroxides, said mixture comprising at least one relatively slowly-hydrolyzable alcoholate of a higher alcohol, and slowly forming within said formation a water-insoluble hydroxide by reaction of said mixture with water.

6. In a process for decreasing the permeability of a porous formation, the steps of introducing thereinto a mixture of alcoholates of metals forming water-insoluble hydroxides, said mixture comprising at least one relatively slowly-hydrolyzable alcoholate of a substituted alcohol, and slowly forming within said formation a water-insoluble hydroxide by reaction of said mixture with water.

7. In a process for decreasing the permeability of a porous formation, the steps of introducing thereinto a mixture of alcoholates of metals forming water-insoluble hydroxides, said mixture comprising at least one relatively slowly-hydrolyzable alcoholate of a polyhydric alcohol, and slowly forming within said formation a water-insoluble hydroxide by reaction of said mixture with water.

FRANKLIN A. BENT.
ALBERT G. LOOMIS.
HOWARD C. LAWTON.

DISCLAIMER 2,169,458.—*Franklin A. Bent, Albert G. Loomis*, and *Howard C. Lawton*, Berkeley, Calif. METHOD OF SEALING OFF WATER AND GAS LAYERS. Patent dated August 15, 1939. Disclaimer filed October 1, 1940, by the assignee, *Shell Development Company*.

Hereby enters this disclaimer to claim 1 of said Letters Patent, and disclaims from the scope of claim 2 all processes for decreasing the permeability of a porous formation except those wherein there is introduced into the porous formation a metal alcoholate having the formula recited in claim 2, but wherein not more than one of the three radicals $R_1$, $R_2$, and $R_3$, is hydrogen, and disclaims from the scope of claim 3 all processes for sealing off water and gas bearing formations traversed by a well except those wherein there is introduced into the well a metal alcoholate having the formula

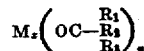

wherein M is any metal forming a water-insoluble hydroxide; O and C are an oxygen and a carbon atom, respectively; $R_1$, $R_2$, and $R_3$ are radicals selected from the group consisting of hydrogen, alkyl, aryl, substituted alkyl, and substituted aryl radicals, not more than one of which radicals is hydrogen, and $x$ and $y$ are subscripts satisfying valence requirements.

[*Official Gazette October 29, 1940.*]